(12) United States Patent
Kabe

(10) Patent No.: US 10,223,920 B2
(45) Date of Patent: Mar. 5, 2019

(54) DISPLAY DEVICE FOR VEHICLE

(71) Applicant: SUBARU CORPORATION, Tokyo (JP)

(72) Inventor: Keiko Kabe, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 15/808,426

(22) Filed: Nov. 9, 2017

(65) Prior Publication Data

US 2018/0158339 A1 Jun. 7, 2018

(30) Foreign Application Priority Data

Dec. 1, 2016 (JP) ................................. 2016-233776

(51) Int. Cl.
*G06G 1/16* (2006.01)
*G08G 1/16* (2006.01)
*B60R 1/00* (2006.01)

(52) U.S. Cl.
CPC ............... *G08G 1/167* (2013.01); *B60R 1/00* (2013.01); *B60R 2300/804* (2013.01)

(58) Field of Classification Search
CPC ................................. G08G 1/167; B60R 1/00
See application file for complete search history.

(56) References Cited

U.S. PATENT DOCUMENTS

| 7,482,909 B2* | 1/2009 | Haug ........................ B60R 1/00 340/425.5 |
| 8,508,383 B2 | 8/2013 | Peterson et al. |
| 2007/0106471 A1 | 5/2007 | Yoshiguchi et al. |
| 2010/0123778 A1* | 5/2010 | Hada .......................... B60R 1/00 348/148 |
| 2012/0314055 A1* | 12/2012 | Kataoka ................. G08G 1/167 348/117 |
| 2014/0097968 A1 | 4/2014 | Kamiya et al. |
| 2014/0210604 A1 | 7/2014 | Kawashima et al. |

(Continued)

FOREIGN PATENT DOCUMENTS

| JP | 07-200996 A | 8/1995 |
| JP | 09-091596 A | 4/1997 |

(Continued)

OTHER PUBLICATIONS

Notice of Allowance issued in related U.S. Appl. No. 15/808,535, dated May 23, 2018.

(Continued)

*Primary Examiner* — Leon Flores
(74) *Attorney, Agent, or Firm* — McDermott Will & Emery LLP

(57) ABSTRACT

A display device for a vehicle includes a surrounding environment recognition unit and a display unit. The display unit displays an own-vehicle icon and line icons on right and left sides of the own-vehicle icon. The line icons correspond to the lane markers of an own-vehicle-traveling lane, and are displayed, with a clearance between them narrowing as is farther away from the own-vehicle icon. The own-vehicle icon is on fixed display. The line icons are on movable display in a lateral direction of a display area, in an opposite direction to a direction of movement of the own vehicle in a direction of a lane width of the own-vehicle-traveling lane.

15 Claims, 5 Drawing Sheets

(56) References Cited

U.S. PATENT DOCUMENTS

2015/0314783 A1* 11/2015 Nespolo ............ B60W 30/0953
701/301
2018/0157038 A1* 6/2018 Kabe ...................... G08G 1/167

FOREIGN PATENT DOCUMENTS

| JP | 11-126300 | 5/1999 |
| JP | 11-264868 A | 9/1999 |
| JP | 2002-074596 A | 3/2002 |
| JP | 2007-125969 A | 5/2007 |
| JP | 2014-203122 A | 10/2014 |

OTHER PUBLICATIONS

Notice of Allowance issued in related U.S. Appl. No. 15/808,535, dated May 23, 2018, now U.S. Pat. No. 10,082,670, granted Sep. 25, 2018.

Japanese Office Action issued in corresponding Japanese Patent Application No. 2016-233776, dated Sep. 25, 2018, with English Translation.

Japanese Office Action issued in corresponding Japanese Patent Application No. 2016-233776, dated Dec. 18, 2018, with English Translation.

\* cited by examiner

# DISPLAY DEVICE FOR VEHICLE

CROSS-REFERENCE TO RELATED APPLICATIONS

The present application claims priority from Japanese Patent Application No. 2016-233776 filed on Dec. 1, 2016, the entire contents of which are hereby incorporated by reference.

BACKGROUND

The technology relates to a display device for a vehicle that recognizes surrounding environment of a vehicle and provides display in a display area.

In recent years, lane departure warning (LDW) has been known, as one of systems that assist with safe travel of automobiles. LDW, being called a lane deviation alarm device, is a system that recognizes, with the use of, for example, a camera system mounted on an automobile, lane lines of a lane on which an own vehicle travels, and predicts deviation from the lane to give an alarm to a driver.

Japanese Unexamined Patent Application Publication (JP-A) No. 2007-125969 discloses one example of existing vehicle deviation alarm devices. The vehicle deviation alarm device mainly includes an electronic control unit (ECU) for determination as to lane deviation, an ECU for alarm display, a charge coupled device (CCD) camera, a vehicle speed sensor, a steering angle sensor, and a display.

In a case where the ECU for the determination as to the lane deviation recognizes the lane lines on both right and left sides of the own vehicle, through, for example, the CCD camera, the display displays the lane lines on both the right and left sides of the own vehicle. In a case where the ECU for the determination as to the lane deviation does not recognize one of the lane lines, the display displays the un-recognized lane line in dotted outline. In this way of display, the driver can recognize whether or not the ECU for the determination as to the lane deviation recognizes the lane lines on both the right and left sides of the own vehicle.

In a case where the ECU for the determination as to the lane deviation determines, through, for example, the vehicle speed sensor, high possibility of the deviation of the own vehicle from the lane toward either the right lane line or the left lane line, the display provides highlighted display of the lane line in a direction of the deviation, together with character display of lane deviation. In this way of display, the driver can recognize which possibility is higher, of deviation of the own vehicle from the lane toward the right lane line or the left lane line.

JP-A No. H11-126300 discloses one example of existing vehicle deviation alarm devices. The vehicle deviation alarm device mainly includes a camera for borderline imaging, a vehicle speed sensor, a steering angle sensor, a control unit, a warning sound generator unit, and a display unit.

The control unit processes data acquired from, for example, the camera for the borderline imaging or the vehicle speed sensor, and determines a position of the own vehicle in a traveling lane. On the basis of a determination result, the control unit notifies a driver of possibility of lane deviation of the own vehicle through the warning sound generator unit or the display unit.

For example, in a case where the control unit determines that the own vehicle is offset leftward in the traveling lane, the warning sound generator unit adjusts volume of a speaker, and gives a notification, to allow the driver to hear the warning sound from left side of the driver. Meanwhile, the display unit displays the own vehicle at a display position closer to a display position of a left lane line. In this way, the driver can determine which side the own vehicle is offset on in the traveling lane while traveling, on the basis of the display position of the own vehicle or the direction in which the driver hears the warning sound.

SUMMARY

As described, the display device for the vehicle displays a traveling position of the own vehicle in the traveling lane. In such a display device, it is desirable to make it possible to allow the driver to intuitively grasp surrounding environment of the own vehicle.

It is desirable to provide a display device for a vehicle that makes it possible to allow a driver to intuitively grasp surrounding environment of an own vehicle.

An aspect of the technology provides a display device for a vehicle. The display device includes a surrounding environment recognition unit and a display unit. The surrounding environment recognition unit is configured to recognize surrounding environment of an own vehicle. The display unit includes a display area and is configured to display, in the display area, information to be notified to a driver, on the basis of a recognition result of the surrounding environment recognition unit. The display unit is configured to display an own-vehicle icon substantially in the middle of the display area in a lateral direction of the display area, and displays line icons on right and left sides of the own-vehicle icon on the condition that the surrounding environment recognition unit recognizes lane markers on right and left sides of an own-vehicle-traveling lane on which the own vehicle travels. The line icons correspond to the lane markers of the own-vehicle-traveling lane. The line icons are displayed, with a clearance between the line icons narrowing as is farther away from the own-vehicle icon. The own-vehicle icon is on fixed display. The line icons are on movable display in the lateral direction of the display area, in an opposite direction to a direction of movement of the own vehicle in a direction of a lane width of the own-vehicle-traveling lane.

An aspect of the technology provides a display device for a vehicle. The display device includes a detector, a display, and circuitry. The detector is configured to detect surrounding environment of an own vehicle. The display includes a display area and is configured to display, in the display area, information to be notified to a driver. The circuitry allows the display to display the information on the basis of a detection result of the detector. The circuitry is configured to cause an own-vehicle icon to be displayed substantially in the middle of the display area in a lateral direction of the display area. The circuitry is configured to cause line icons to be displayed on right and left sides of the own-vehicle icon on the condition that the detector detects lane markers on right and left sides of an own-vehicle-traveling lane on which the own vehicle travels. The line icons correspond to the lane markers of the own-vehicle-traveling lane. The circuitry is configured to cause the line icons to be displayed, with a clearance between the line icons narrowing as is farther away from the own-vehicle icon. The circuitry is configured to cause the own-vehicle icon to be on fixed display. The circuitry is configured to cause the line icons to be on movable display in the lateral direction of the display area, in an opposite direction to a direction of movement of the own vehicle in a direction of a lane width of the own-vehicle-traveling lane.

DETAILED DESCRIPTION

Figure 1A:
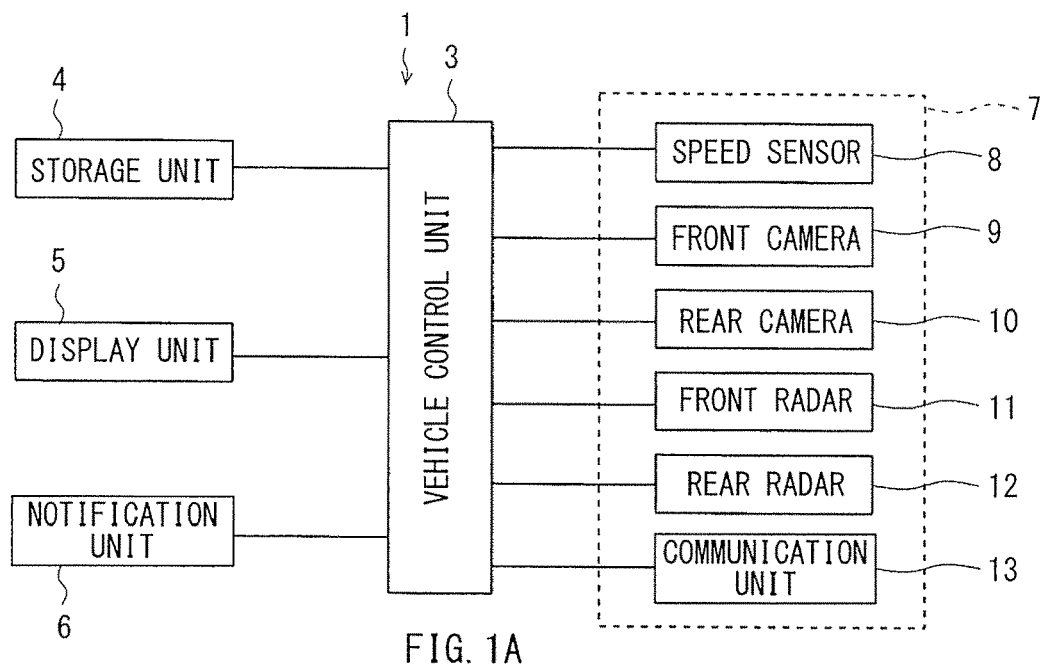
FIG. 1A is a block diagram in outline of a display device for a vehicle according to one implementation of the technology.

In the following, some implementations of the technology are described in detail with reference to the drawings. It is to be noted that in the description of the implementations, the same members are basically denoted by the same reference characters, with description thereof omitted to avoid redundancy.

Figure 1B:
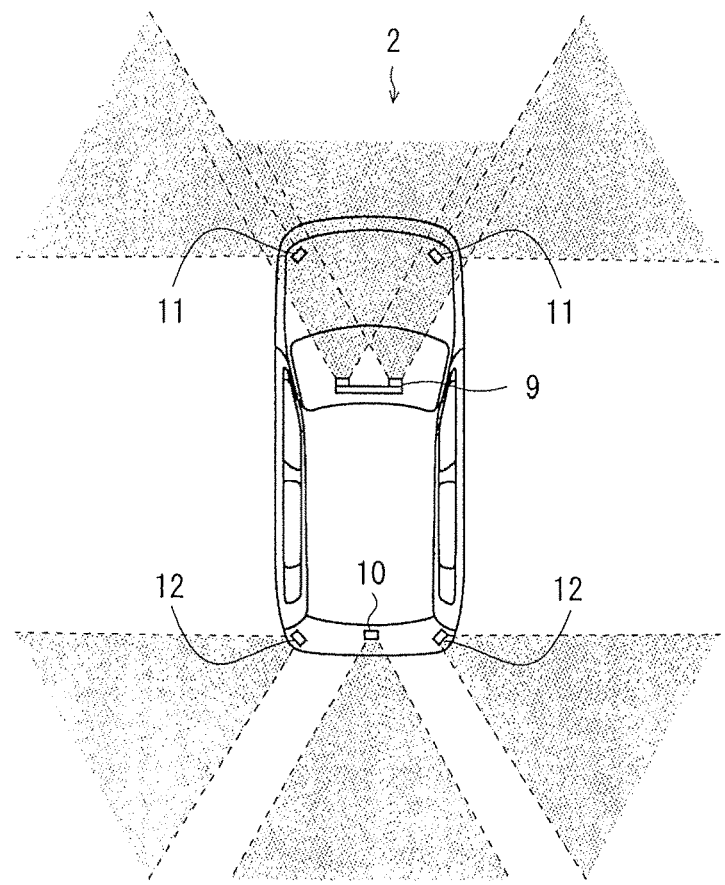
FIG. 1B illustrates a vehicle including the display device for the vehicle according to the implementation of the technology.
Figure 2A:
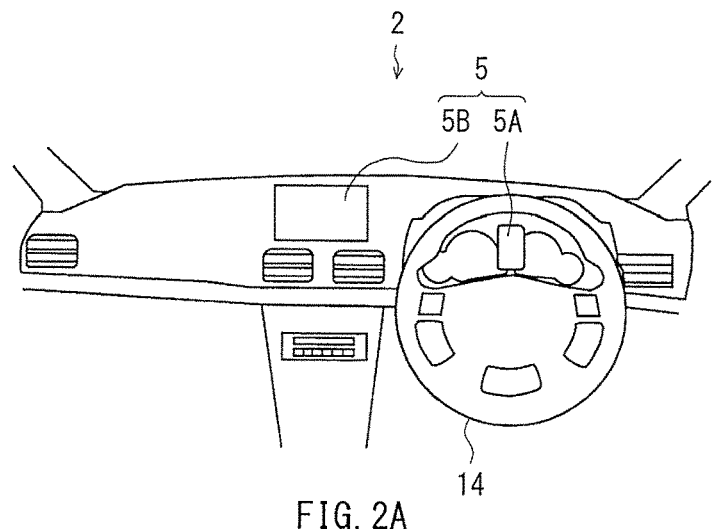
FIG. 2A illustrates the display device for the vehicle according to the implementation of the technology, and illustrates an inside of the vehicle.
Figure 2B:
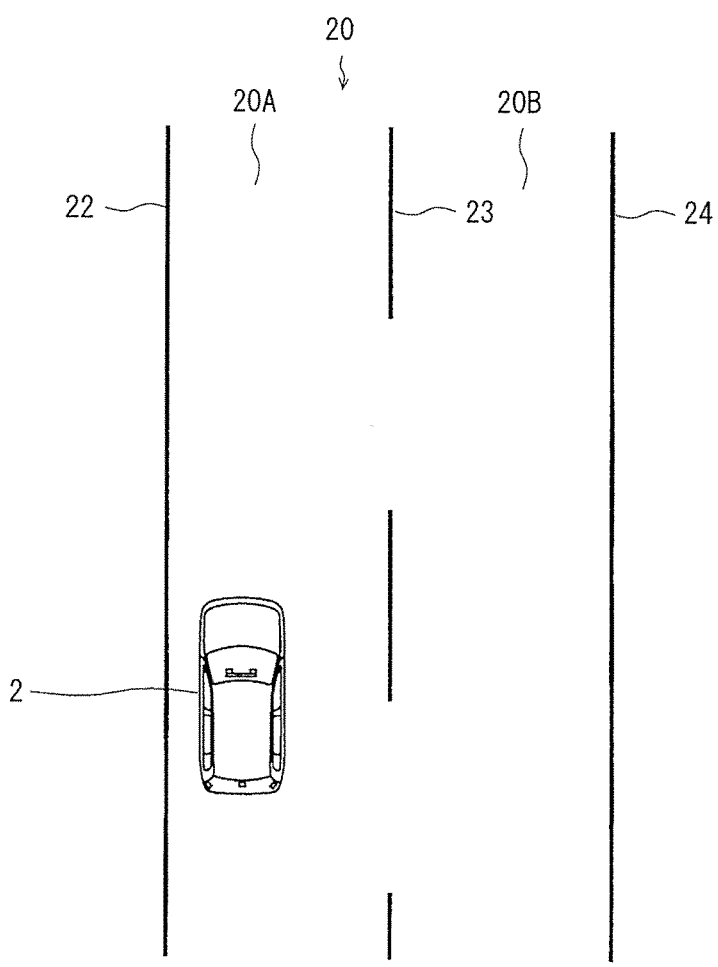
FIG. 2B illustrates the display device for the vehicle according to the implementation of the technology, and illustrates a traveling sate of the vehicle on a road.

FIG. 1A is a block diagram that illustrates in outline a display device 1 for a vehicle according to one implementation. FIG. 1B illustrates a vehicle 2 on which the display device 1 for the vehicle according to this implementation is mounted. FIG. 2A illustrates a display unit 5 of the display device 1 for the vehicle according to this implementation. The display unit 5 may be in an inside of the vehicle 2. FIG. 2B illustrates a traveling state on a road, of the vehicle 2 on which the display device 1 for the vehicle according to this implementation is mounted.

Referring to FIG. 1A, the display device 1 for the vehicle may be mounted on the vehicle 2, and mainly include a vehicle control unit 3, a storage unit 4, a display unit 5, a notification unit 6, and a surrounding environment recognition unit 7. Functions in outline of the display device 1 for the vehicle may include allowing the display unit 5 to display surrounding information of the vehicle 2 on the basis of the surrounding information acquired from the surrounding environment recognition unit 7. The surrounding environment recognition unit 7 may include, for example, a front camera described later. Thus, the display device 1 for the vehicle may assist a driver in intuitively grasping traveling environment of the vehicle 2.

In one implementation of the technology, the vehicle 2 may serve as an "own vehicle". In one implementation of the technology, the display unit 5 may serve as a "display unit" or a "display". In one implementation of the technology, the surrounding environment recognition unit 7 may serve as a "surrounding environment recognition unit" or a "detector".

The vehicle control unit 3 may include, for example, a central processing unit (CPU), a read only memory (ROM), a random access memory (RAM). The vehicle control unit 3 may be, for example, an electronic control unit (ECU) that executes, for example, various kinds of calculations for a vehicle control. The vehicle control unit 3 may perform, for example, the various kinds of the calculations on the basis of a recognition result supplied from the surrounding environment recognition unit 7. Thus, the vehicle control unit 3 may control, for example, the display unit 5 and the notification unit 6, to accurately inform the driver of the surrounding information of the vehicle 2.

In one implementation of the technology, the vehicle control unit 3, the display unit 5, and the surrounding environment recognition unit 7 may serve as "circuitry".

The storage unit 4 may include, for example, a non-volatile memory such as an electrically erasable programmable read-only memory (EEPROM). The storage unit 4 may store various kinds of data involved in the control of the vehicle 2. The storage unit 4 may store a map database, as one of the various kinds of the data. The map database may include, for example, a navigation database and a detailed map database. The navigation database may be used in a navigation unit. The detailed map database may include more detailed map data than that of the navigation database.

In the navigation database, stored may be map information related to the traveling environment, without limitation. Non-limiting examples may include positions of intersections and traffic signals, the number of lanes of roads, radii of curvature of the roads, speed limitation, and no-passing sections. Positioning of an own-vehicle position on the map of the vehicle 2 may be made by, for example, global positioning system (GPS) satellites. The own-vehicle position may be displayed on the display unit 5. In the detailed map database, stored may be data on shapes of the roads, azimuths of the roads, classification of lane lines of the roads, and the number of lanes, without limitation. Non-limiting examples of the data on the shapes of the roads may include the radii of curvature, lane widths, shoulder widths of the roads on which the vehicle 2 travels. The detailed map database, in combination with information on the own-vehicle position of the vehicle 2 positioning of which is made by the GPS satellites, may serve as the surrounding environment recognition unit 7 of the display device 1 for the vehicle.

The display unit 5 may include, for example, a display 5A as illustrated in FIG. 2A, and a display 5B as illustrated in FIG. 2A. The display 5A may be disposed in an instrument panel in front of the driver, in the inside of the vehicle 2. The display 5B may be disposed in an upper part near a central part of the instrument panel of the vehicle 2. Although details are described later, the display unit 5 may display an own-vehicle icon and line icons. The own-vehicle icon may correspond to the vehicle 2. The line icons may correspond to lane markers of the roads.

The notification unit 6 may output, for example, sound or an image. The sound may make a notification with the use of sense of hearing of an occupant. The image may make a notification with the use of sense of vision of the occupant. The notification by the sound may be made with the use of a speaker provided on the vehicle 2. The notification by the image may be made with the use of the display unit 5 provided in the vehicle 2.

The surrounding environment recognition unit 7 may recognize the traveling environment around the vehicle 2 through, for example, various kinds of sensors and cameras mounted on the vehicle 2. Non-limiting examples of the various kinds of the sensors and the cameras may include a vehicle speed sensor 8, a front camera 9, a rear camera 10, front radar 11, rear radar 12, and a communication unit 13.

Referring to FIG. 1B, the various kinds of the sensors and the cameras may constitute the surrounding environment recognition unit 7, and be located at appropriate positions of the vehicle 2. Thus, the various kinds of the sensors and the cameras may be able to acquire the surrounding information of the vehicle 2, as respectively indicated by sandy shaded regions.

The vehicle speed sensor 8 may be a sensor that measures a speed of the vehicle 2 on the basis of, for example, the number of rotations of an engine or tires.

The front camera 9 may be, for example, a stereo camera installed in an upper part near a front windshield in vehicle interior of the vehicle 2. The front camera 9 as the stereo camera may include, for example, a plurality of cameras. The plurality of the cameras each include an image sensor such as a CCD image sensor and a complementary metal oxide semiconductor (CMOS) image sensor. The front camera 9 may be a device that captures images of an object from different points of views. The front camera 9 may be unitized with, for example, an undepicted image processing engine. The image processing engine may recognize objects forward of the vehicle 2, e.g., lane lines of the roads, side walls, and three-dimensional objects, on the basis of captured images obtained by the stereo camera and on the basis of distance information obtained with the captured image. Various kinds of data obtained by the recognition processing may be transmitted, as the surrounding information forward of the vehicle 2, to the vehicle control unit 3, and be stored in the storage unit 4.

The front radar 11 may be, for example, radar provided at both right and left ends of a front end part of the vehicle 2. As the front radar 11, adopted may be millimeter wave radar. Adopting the front radar 11 makes it possible to calculate a distance from the vehicle 2 to an object that exists sideward or forward of the vehicle 2. Moreover, as the front radar 11, laser radar may be used, to recognize the lane markers of the roads, e.g., lane lines. It is to be noted that various kinds of data acquired by the front radar 11 may be transmitted, as the surrounding information forward of the vehicle 2, to the vehicle control unit 3, and be stored in the storage unit 4.

The rear camera 10 may be disposed in a rear end part of the vehicle 2. This makes it possible to detect an object that exists rearward of the vehicle 2. The rear radar 12 may be disposed at both right and left ends of the rear end part of the vehicle 2. This makes it possible to calculate a distance from the vehicle 2 to an object that exists sideward or rearward of the vehicle 2. It is to be noted that the rear camera 10 may be also unitized with the undepicted image processing engine. Various kinds of data acquired by the rear camera 10 and the rear radar 12 may be transmitted, as the surrounding information rearward of the vehicle 2, to the vehicle control unit 3, and be stored in the storage unit 4.

The communication unit 13 may perform road-vehicle communication and inter-vehicle communication, and receive the own-vehicle position from the GPS satellites. For the road-vehicle communication, for example, adopted may be a device that accords with an intelligent transport system (ITS). The communication unit 13 may receive light or radio wave beacon from road ancillary equipment, and thereby be able to acquire various kinds of information such as information on traffic congestion, weather information, and information on traffic regulation of a specific section.

In one implementation of the technology, the communication unit 13 may serve as a "communication unit".

FIG. 2A illustrates equipment including the instrument panel in front of the driver, inside the vehicle interior of the vehicle 2. On the instrument panel, the displays 5A and 5B as the display unit 5 may be disposed at, for example, two locations. The display 5A may be provided in front of a steering wheel 14, between speed meters, at a position that allows the driver at a driving position to see the display 5A through the steering wheel 14. In other words, the driver can check display contents of the display 5A by slightly lowering his or her eyes in a heightwise direction of the vehicle 2, while driving the vehicle 2 and seeing a traveling lane through the front windshield. This makes it possible to provide display in consistency with a view the driver actually gets.

It is to be noted that the display 5A is not an exclusive display that serves as the display unit 5. For example, the display 5B disposed near the central part of the instrument panel of the vehicle 2 may be used to provide the display of this implementation. In a case with the use of the display 5B, the display area is larger than that of the display 5A. Accordingly, it is possible to increase a size of icon display, and to increase an amount of information to be informed to the driver.

FIG. 2B illustrates a state in which the vehicle 2 is traveling on a road 20 that includes two lanes on each side. The road 20 may include, for example, lanes 20A and 20B. For example, the vehicle 2 may be traveling on the lane 20A on left side of the road 20. The road 20 may be divided into the two lanes, e.g., the lanes 20A and 20B, on one side, by a lane marker 22 at a left end, a middle lane marker 23, and a lane marker 24 at a right end. The lane marker 23 may indicate permission of passing.

The lane markers 22 to 24 as mentioned above may be lines that extend on the road 20 and define the traveling lane. The lane markers 22 to 24 may each be a solid line or a broken line, or any other patterned line. The lane markers 22 to 24 may each be a white line or a yellow line, or any other colored line. For example, the lane markers 22 to 24 such as white lines have properties of higher luminance than that of a surface of the road 20. With the use of the properties, the unit including the front camera 9 and the image processing engine may evaluate changes in luminance in a widthwise direction of the road 20 to identify, on an image plane, positions of the lane markers 22 to 24 on right and left sides of the image plane. It is to be noted that as mentioned above, in a case with the use of laser radar as the front radar 11 as well, it is possible to identify the lane markers 22 to 24 with the use of the changes in the luminance.

Figure 3:
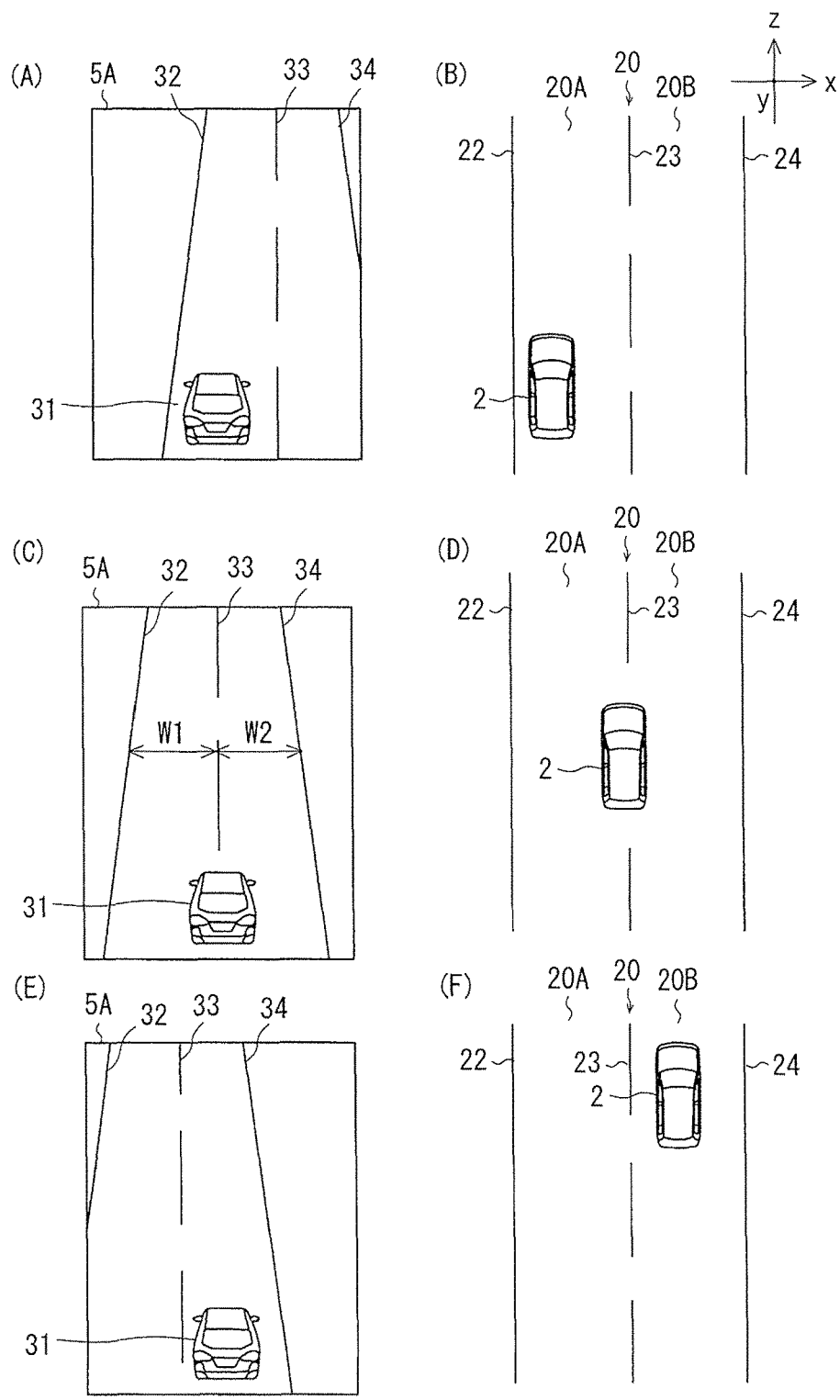
FIG. 3 illustrates the display device for the vehicle according to the implementation of the technology, with (A), (C), and (E) illustrating display examples of a display unit, and with (B), (D), and (F) illustrating traveling states of the vehicle on the road.

In FIG. 3, (A), (C), and (E) illustrate display examples of the display 5A that serves as the display unit 5 of the display device 1 for the vehicle according to this implementation. In FIG. 3, (B), (D), and (F) illustrate actual traveling states of the vehicle 2 on the road 20, and respectively correspond to (A), (C), and (E) of FIG. 3. In the description of (A) to (F) of FIG. 3, reference is made as appropriate to the description of FIGS. 1A, 1B, 2A, and 2B.

First, (A) and (B) of FIG. 3 illustrate a state in which the vehicle 2 is traveling on the lane 20A on the left side of the road 20. As illustrated in (B) of FIG. 3, the vehicle 2 is traveling straight on the lane 20A, but is offset from the middle of the road 20 toward the lane marker 22. The surrounding environment recognition unit 7 may recognize the lane markers 22 to 24 of the road 20. On the basis of data acquired by the recognition processing, the surrounding environment recognition unit 7 may generate lane width data of the lane 20A on which the vehicle 2 travels, and distance data from the own-vehicle position of the vehicle 2 to each of the lane markers 22 and 23 on the right and left sides of the vehicle 2. Thereafter, the surrounding environment recognition unit 7 may perform calculations with the use of the various kinds of the data as mentioned above, and generate relative positional data of the vehicle 2 with respect to the lane markers 22 and 23 on the right and left sides, and relative positional data for display. The surrounding environment recognition unit 7 may store the data thus generated, in the storage unit 4.

In one specific but non-limiting example, the surrounding environment recognition unit 7 may suppose that a lateral width direction of the vehicle 2 be an x axis, the heightwise direction of the vehicle 2 be a y axis, and a lengthwise direction of the vehicle 2 be a z axis, with a road surface directly below the middle of the stereo camera as the front camera 9 serving as an origin. The surrounding environment recognition unit 7 may generate the distance data by a principle of triangulation from an amount of positional deviation between mutually corresponding image parts, on the basis of a set of stereo images captured in a traveling direction of the vehicle 2 by the stereo camera. The surrounding environment recognition unit 7 may acquire, as the distance data, the lane width data of the lane 20A on which the vehicle 2 travels, and the distance data from the own-vehicle position of the vehicle 2 to each of the lane markers 22 and 23 on the right and left sides, without limitation. The surrounding environment recognition unit 7 may calculate a ratio of the lane width data of the lane 20A as mentioned above to the distance data from the vehicle 2 to each of the lane markers 22 and 23 on the right and left sides, to generate the relative positional data of the vehicle 2 with respect to the lane markers 22 and 23 on the right and left sides. Thereafter, on the basis of the relative positional data as mentioned above, the surrounding environment recognition unit 7 may calculate and generate the relative positional data for the display on the display unit 5.

As illustrated in (A) of FIG. 3, the display 5A of the display unit 5 includes, for example, a display area. The display area may be shaped as a vertically elongated rectangle. The display 5A displays an own-vehicle icon 31 and three pieces of line icons 32, 33, and 34. The own-vehicle icon 31 may correspond to the vehicle 2 as illustrated in (B) of FIG. 3. The line icon 32 may correspond to the lane marker 22 as illustrated in (B) of FIG. 3. The line icon 33 may correspond to the lane marker 23 as illustrated in (B) of FIG. 3. The line icon 34 may correspond to the lane marker 24 as illustrated in (B) of FIG. 3.

In this implementation, the own-vehicle icon 31 may be displayed near a lower end of a central part of the display 5A. The own-vehicle icon 31 is constantly on fixed display at this position, even in a case where the vehicle 2 slightly meanders in the direction of the lane width of the lane 20A, or in a case where the vehicle 2 makes, for example, a lane change. Meanwhile, the line icons 32 to 34 are on movable display in a right-left direction in the sheet of paper, i.e., the direction of the lane width, in the display 5A. In this example, as described with reference to (B) of FIG. 3, the vehicle 2 is traveling on the lane 20A, but is offset toward the lane marker 22. Accordingly, in (A) of FIG. 3, the line icons 32 to 34 may be on the movable display to the right side in the sheet of paper in the display 5A with respect to the own-vehicle icon 31, with the line icon 32 being displayed at a closest position to the own-vehicle icon 31.

Thereafter, in (C) and (D) of FIG. 3, the vehicle 2 is traveling obliquely forward on the road 20, in order to make a lane change from the lane 20A on the left side of the road 20 to the lane 20B on the right side. As illustrated in (D) of FIG. 3, the vehicle 2 may be in the middle of the lane change, and be traveling over the lane marker 23. In this case as well, as described above, the surrounding environment recognition unit 7 may recognize the lane markers 22 to 24 of the road 20, and generate the relative positional data of the vehicle 2 with respect to the lane markers 22 to 24, and the relative positional data for the display. The surrounding environment recognition unit 7 may store the data thus generated, in the storage unit 4.

As illustrated in (C) of FIG. 3, in reality, the vehicle 2 is moving from the left side to the right side in the sheet of paper. In the display 5A, however, the own-vehicle icon 31 is on the fixed display near the lower end of the central part of the display area. The line icons 32 to 34 are on the movable display to the left side in the sheet of paper in the display 5A with respect to the own-vehicle icon 31, with the own-vehicle icon 31 being displayed over the line icon 33.

Thereafter, in (E) and (F) of FIG. 3, the vehicle 2 has finished the lane change to the lane 20B on the right side of the road 20, and is traveling straight on the lane 20B. As illustrated in (F) of FIG. 3, after making the lane change, the vehicle 2 is traveling on the lane 20B and is offset toward the lane marker 23 of the lane 20B. In this case as well, as described above, the surrounding environment recognition unit 7 may recognize the lane markers 22 to 24 of the road 20, and generate the relative positional data of the vehicle 2 with respect to the lane markers 23 and 24, and the relative positional data for the display. The surrounding environment recognition unit 7 may store the data thus generated, in the storage unit 4.

As illustrated in (E) of FIG. 3, in reality, the vehicle 2 is moving from the left side to the right side in the sheet of paper. In the display 5A, however, the own-vehicle icon 31 is on the fixed display near the lower end of the central part of the display area. The line icons 32 to 34 are on the movable display to the left side in the sheet of paper in the display 5A with respect to the own-vehicle icon 31, with the line icon 33 being displayed at the closest position to the own-vehicle icon 31.

It is to be noted that in (A) of FIG. 3, for example, in a case with possibility that the vehicle 2 deviates from the lane 20A toward the lane marker 22, blinking display of the line icon 32 may be made. In (E) of FIG. 3, for example, in a case with possibility that the vehicle 2 deviates from the lane 20B toward the lane marker 23, blinking display of the line icon 33 may be made. Thus, highlighted display of the line icons 32 and 33 may be provided for the driver's attention. In addition, together with the highlighted display, an alarm sound may be produced from the speaker that may serve as the notification unit 6. In (C) of FIG. 3, in a case where the vehicle 2 makes the lane change while blinking a turn signal, no highlighted display of the line icon 33 may be made, nor may any alarm sound be produced from the speaker.

As described, the display 5A provides the fixed display of the own-vehicle icon 31, and the movable display of the line icons 32 to 34 in the right-left direction in the sheet of paper. This way of display prevents swinging display of the own-vehicle icon 31 in the right-left direction in the sheet of paper in the display 5A. Moreover, it is possible to prevent flickering display of the own-vehicle icon 31, and to prevent difficulties for the driver in seeing the own-vehicle icon 31. Hence, it is possible for the driver to easily and intuitively grasp the own-vehicle position in the traveling lane.

Furthermore, widths of regions between the line icons 32 to 34, i.e., the lane widths W1 and W2 on display as illustrated in (C) of FIG. 3, may be constant, regardless of changes in actual widths of the lanes 20A and 20B as illustrated in (D) of FIG. 3. In this way of display, the line icons 32 to 34 may be on the movable display solely in the right-left direction in the sheet of paper, not in accordance with the actual widths of the lanes 20A and 20B, but in accordance with clearances from the own-vehicle icon 31. In other words, an amount of movement of the line icons 32 to 34 may be set at a necessary minimum. This prevents flickering display of the line icons 32 to 34, and prevents difficulties for the driver in seeing the line icons 32 to 34. Hence, it is possible for the driver to easily and intuitively grasp the own-vehicle position in the traveling lane.

When the driver actually drives the vehicle 2, it is supposed that many drivers visually have feeling that they are driving the vehicle 2 along the traveling lane, instead of feeling that the vehicle 2 is traveling while slightly meandering rightward and leftward in the traveling lane. Accordingly, allowing the display 5A to provide the fixed display of the own-vehicle icon 31 and the movable display of the line icons 32 to 34 with respect to the own-vehicle icon 31 makes it possible to provide the display in consistency with the view the driver actually gets. Hence, it is easy for the driver to intuitively and accurately grasp the position of the vehicle 2 in the traveling lane.

As illustrated in (A), (C), and (E) of FIG. 3, the line icons 32 to 34 are displayed, with clearances between the line icons 32 to 34 narrowing as goes upward in the sheet of paper, i.e., as is farther away from the own-vehicle icon 31. This way of display also provides display in consistency with perspective of the view the driver actually gets. Hence, it is possible for the driver to easily and intuitively grasp information on the traveling lane forward.

Figure 4:
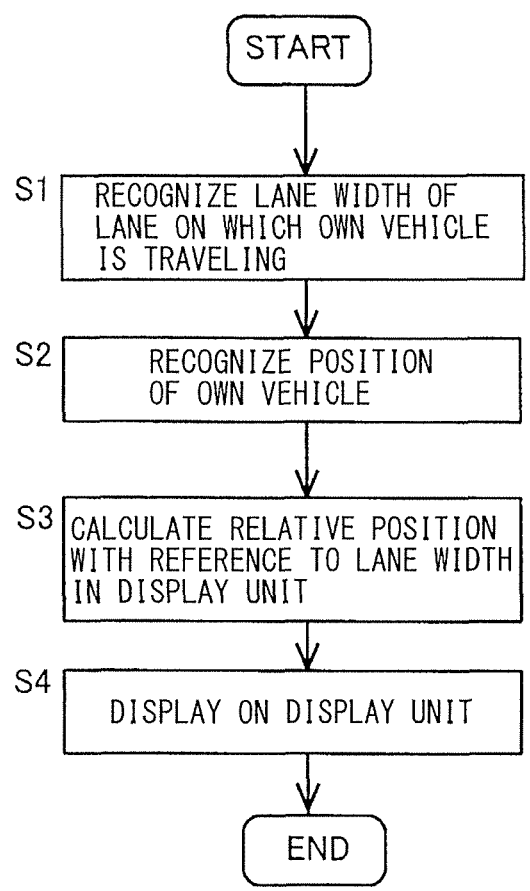
FIG. 4 is a flowchart of one example of control operation of the display device for the vehicle according to the implementation of the technology.

FIG. 4 is a flowchart of one example of control operation to provide display on the display unit 5 of the display device 1 for the vehicle according to this implementation. It is to be noted that the flowchart of FIG. 4 is described with the use of the traveling state illustrated in (A) and (B) of FIG. 3.

Referring to FIG. 4, in step S1, the vehicle control unit 3 may control the storage unit 4 and the surrounding environment recognition unit 7, to cause them to operate as follows. The surrounding environment recognition unit 7 may recognize the lane width of the lane 20A on which the vehicle 2 is traveling. As described, the surrounding environment recognition unit 7 may acquire the images in the traveling direction of the vehicle 2, through the stereo camera as the front camera 9 of the surrounding environment recognition unit 7. On the basis of the set of the stereo images captured, the surrounding environment recognition unit 7 may acquire the lane width data of the lane 20A by the principle of the triangulation from the amount of the positional deviation between the mutually corresponding image parts, with the image processing engine unitized with the front camera 9. The surrounding environment recognition unit 7 may store the data thus acquired, in the storage unit 4. It is to be noted that in a case where the surrounding environment recognition unit 7 recognizes the adjacent lane 20B, the surrounding environment recognition unit 7 may also acquire the lane width data of the lane 20B, and store the data in the storage unit 4.

Thereafter, in step S2, the vehicle control unit 3 may control the storage unit 4 and the surrounding environment recognition unit 7, to cause them to operate as follows. The surrounding recognition unit 7 may recognize, on the basis of the distance data, the own-vehicle position, i.e., the position where the vehicle 2 is traveling in the lane 20A with respect to the lane width direction. The distance data may be generated by the triangulation in step S1 as mentioned above. The surrounding environment recognition unit 7 may acquire not only the lane width data by the triangulation as mentioned above, but also the distance data from the vehicle 2 to each of the lane markers 22 and 23 on the right and left sides, with the road surface directly below the middle of the stereo camera as mentioned above serving as the origin. The surrounding environment recognition unit 7 may store the distance data in the storage unit 4. The surrounding environment recognition unit 7 may calculate, with the image processing engine, the ratio of the lane width data to the distance data from the vehicle 2 to each of the lane markers 22 and 23 on the right and left sides, to generate the relative positional data of the own vehicle with respect to the lane 20A. The surrounding environment recognition unit 7 may store the data in the storage unit 4.

Thereafter, in step S3, the vehicle control unit 3 may control the storage unit 4 and the surrounding environment recognition unit 7, to cause them to operate as follows. The surrounding environment recognition unit 7 may calculate the relative positional data for the display, on the basis of the relative positional data as mentioned above with respect to the actual lane 20A, with reference to the lane widths W1 and W2 in the display unit 5 as illustrated in (C) of FIG. 3. As described, the lane widths W1 and W2 are the widths of the regions between the line icons 32 to 34 displayed on the display 5A of the display unit 5. The lane widths W1 and W2 may be constant regardless of the changes in the actual widths of the lanes 20A and 20B. Accordingly, the surrounding environment recognition unit 7 may calculate and generate the relative positional data for the display on the display unit 5, on the basis of the relative positional data as mentioned above with respect to the actual lane 20A. The surrounding environment recognition unit 7 may store the relative positional data for the display, in the storage unit 4.

Thereafter, in step S4, the vehicle control unit 3 may control the storage unit 4 and the display unit 5, to cause them to operate as follows. The display 5A of the display unit 5 may display the own-vehicle icon 31 and the line icons 32 to 34. It is to be noted that the display 5A may display the line icons 32 to 34, in a case where the surrounding environment recognition unit 7 recognizes the lane markers 22 to 24. The display 5A does not have to display the line icons 32 to 34, in a case where the surrounding environment recognition unit 7 does not recognize the lane markers 22 to 24.

It is to be noted that with the front camera 9 being used as the surrounding environment recognition unit 7, there may be a case where the front camera 9 is not able to recognize the lane markers 22 to 24, for example, because of thinning of the lane markers 22 to 24 on the road 20, or during night-time travel. In such situations, in many cases, the driver who is actually driving the vehicle 2 may also fail in visually recognizing the lane markers 22 to 24. The display 5A does not display the line icons 32 to 34 corresponding to the lane markers 22 to 24 that are not recognized by the front camera 9. Thus, the display on the display 5A is consistent with the view the driver gets, making it possible for driver to easily and intuitively grasp the traveling environment around the own vehicle.

In this implementation, described is a case where the front camera 9 is used as the surrounding environment recognition unit 7. However, this is non-limiting. As described, the surrounding environment recognition unit 7 may combine the information on the own-vehicle position of the vehicle 2 with the detailed map database, to calculate and generate the relative positional data for the display on the display unit 5, allowing the display unit 5 to display the own-vehicle icon 31 and the line icons 32 to 34. The positioning of the own-vehicle position may be made by the GPS satellites. The detailed map database may be stored in the storage unit 4. In this case, the line icons 32 to 34 of the lane markers 22 to 24 may be displayed on the display unit 5, even if the driver actually fails in visually recognizing the lane markers 22 to 24. However, for example, in a case where the lane markers 22 to 24 are actually invisible to the driver because of snow, traveling with reference to the line icons 32 to 34 makes it possible to prevent the vehicle 2 from deviating from the lanes 20A and 20B.

As described, in this implementation, the own-vehicle icon is on the fixed display, while the line icons of the lane markers of the road are on the movable display with respect to the own-vehicle icon. Hence, it is possible for the driver to easily and intuitively grasp the surrounding environment of the vehicle.

Specifically, for example, in a vehicle deviation alarm device of JP-A No. 2007-125969, in a case where an ECU for determination as to lane deviation recognizes lane lines on both right and left sides of an own vehicle, a display displays the lane lines on both the right and left sides of the vehicle, to assist the driver in easily grasping a position of the own vehicle in a traveling lane. In a case with high possibility of deviation of the own vehicle from the lane, the display provides highlighted display of the lane line in a direction of the deviation, together with character display of lane deviation.

However, in the vehicle deviation alarm device of JP-A No. 2007-125969, the display displays the lane lines and the characters for the lane deviation, but provides no display of the own vehicle. Usually, what the driver does for safe traveling is, for example, at most, to drive while watching an actual traveling lane through the front windshield, and to check the display in response to an alarm sound. Moreover, because the display of the lane lines are made in a limited region in the display, it is difficult for the driver to intensively check display contents at the time of driving.

Therefore, with the display not displaying the own vehicle between the display positions of the right and left lane lines, it is difficult for the driver to intuitively grasp the position of the own vehicle in the traveling lane. Moreover, as described, lack of display of the own vehicle causes the driver difficulties in intuitively grasping an actual clearance between the own vehicle and the lane line. In other words, with the display area of the display being limited, it is desirable to display the own vehicle, and to reproduce, as faithfully as possible, a view of the traveling lane that the driver actually visually recognizes. Otherwise, it becomes difficult to give the driver an intuitive understanding of accurate information.

Meanwhile, in a vehicle deviation alarm device of JP-A No. H11-126300, a display device displays an own vehicle and a lane on which the own vehicle travels. In a case where a control device determines that the own vehicle is offset in the traveling lane, the own vehicle on display is offset toward the lane line toward which the own vehicle is offset while traveling.

However, the vehicle deviation alarm device of JP-A No. H11-126300 provides fixed display of the right and left lane lines, with a display position of the own vehicle moving with respect to display positions of the lane lines. In general, it is difficult to make the vehicle to travel straight with respect to the traveling lane. Accordingly, the display position of the own vehicle swings in a right-left direction in a display area. The driver has a tendency to look at the display, with the own vehicle as a center, in consistency with the view the driver actually gets at the time of driving. The swinging of the display position of the own vehicle causes the driver difficulties in reading the display. It is therefore difficult for the driver to intuitively grasp the position of the own vehicle in the traveling lane.

Moreover, there are various kinds of roads, e.g., a road including a single lane on each side, a road including two lanes on each side, and a road including three lanes on each side. For example, in a case with the road including three lanes on each side, the vehicle deviation alarm device of JP-A No. H11-126300 provides the fixed display of the right and left lane lines, with the display of the own vehicle moving between the display of the lane lines. Accordingly, it is desirable to provide display of lane lines of three lanes in the display area. As described above, it is difficult to provide a display device with a wide display area. Providing the display of the lane lines of the three lanes causes the display contents to be displayed in a reduced size. It is hard for the driver to read such display and to intuitively grasp the traveling environment. Moreover, with the display area being limited, improvements in display methods are desired, to accurately display the surrounding information of the own vehicle, to provide the driver with easily visible display, and to assist the driver in intuitively grasping the information.

In this implementation, the own-vehicle icon is on the fixed display, while the line icons of the lane markers of the road are on the movable display with respect to the own-vehicle icon. Hence, it is possible for the driver to easily and intuitively grasp the surrounding environment of the vehicle.

Figure 5:
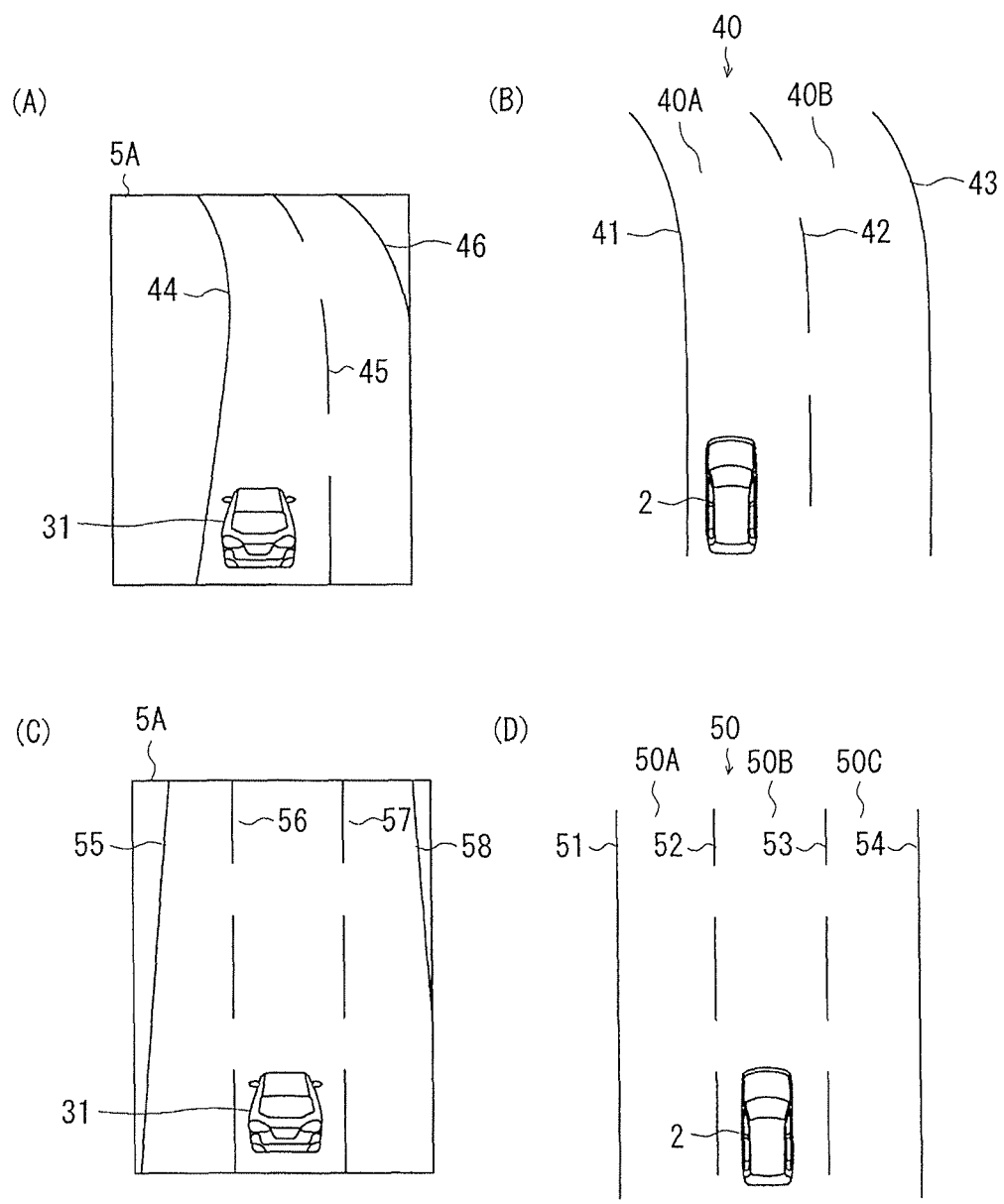
FIG. 5 illustrates a modified implementation of the display device for the vehicle according to the implementation of the technology, with (A) and (C) illustrating display examples of a display unit, and with (B) and (D) illustrating traveling states of the vehicle on a road.

Description is given next of modified implementations of the display device 1 for the vehicle according to the forgoing implementation of the technology, with reference to (A) and (B) of FIG. 5. It is to be noted that the same constituent elements as those of the display device 1 for the vehicle as described with reference to FIGS. 1A to 4 are basically denoted by the same reference characters, with description thereof omitted to avoid redundancy. Described are constituent elements that are different from those of the forgoing implementation.

In FIG. 5, (A) and (C) illustrate display examples of the display 5A that serves as the display unit 5 of the display device 1 for the vehicle according to this implementation. In FIG. 5, (B) and (D) illustrate actual traveling states of the vehicle 2 on roads 40 and 50, and correspond respectively to (A) and (C) of FIG. 5.

First, (A) and (B) of FIG. 5 illustrate a state in which the vehicle 2 is traveling on the road 40 including two lanes on each side. The road 40 may include, for example, lanes 40A and 40B. The road 40 may have a curve forward. As illustrated in (B) of FIG. 5, the vehicle 2 is traveling straight on the lane 40A, and is offset from the middle of the lane 40A toward a lane marker 41. The road 40 may have the curve mildly to the left, forward in the traveling direction of the vehicle 2. It is to be noted that as with the forgoing implementation, the surrounding environment recognition unit 7 may generate the relative positional data of the vehicle 2 with respect to the lane marker 41 and a lane marker 42 on the right and left sides, and the relative positional data with respect to line icons 44 and 45 on the display 5A.

As illustrated in (A) of FIG. 5, the display 5A may display the own-vehicle icon 31 and three pieces of line icons, i.e., the line icons 44 and 45, and a line icon 46. The own-vehicle icon 31 may correspond to the vehicle 2 as illustrated in (B) of FIG. 5. The line icon 44 may correspond to the lane marker 41 as illustrated in (B) of FIG. 5. The line icon 45 may correspond to the lane marker 42 as illustrated in (B) of FIG. 5. The line icon 46 may correspond to the lane marker 43 as illustrated in (B) of FIG. 5.

In this implementation as well, the own-vehicle icon 31 is on the fixed display near the lower end of the central part of the display 5A. The line icons 44 to 46 are on the movable display in the right-left direction in the sheet of paper, i.e., the direction of the lane width, in the display 5A. As illustrated in the figures, in a case where the surrounding environment recognition unit 7 recognizes that the road 40 has the curve forward in the traveling direction, the display 5A may display the line icons 44 to 46, with their upper ends being curved. In this way of display, it is possible for the driver to easily and intuitively grasp a state of the traveling lane.

In FIG. 5, (C) and (D) illustrate a state in which the vehicle 2 is traveling on the road 50 including three lanes on each side. The road 50 may include, for example, lanes 50A, 50B, and 50C. As illustrated in (D) of FIG. 5, the vehicle 2 is traveling straight on the middle lane 50B, and is offset from the middle of the lane 50B toward a lane marker 52. It is to be noted that as with the forgoing implementation, the surrounding environment recognition unit 7 may generate the relative positional data of the vehicle 2 with respect to the lane marker 52 and a lane marker 53 on the right and left sides, and the relative positional data with respect to line icons 56 and 57 on the display 5A.

As illustrated in (C) of FIG. 5, the display 5A may display the own-vehicle icon 31 and four pieces of line icons, i.e., a line icon 55, the line icons 56 and 57, and a line icon 58. The own-vehicle icon 31 may correspond to the vehicle 2 as illustrated in (D) of FIG. 5. The line icon 55 may correspond to a lane marker 51 as illustrated in (D) of FIG. 5. The line icon 56 may correspond to the lane marker 52 as illustrated in (D) of FIG. 5. The line icon 57 may correspond to the lane marker 53 as illustrated in (D) of FIG. 5. The line icon 58 may correspond to a lane marker 54 as illustrated in (D) of FIG. 5.

In this implementation as well, the own-vehicle icon 31 is on the fixed display near the lower end of the central part of the display 5A. The line icons 55 to 58 are on the movable display in the right-left direction in the sheet of paper, i.e., the direction of the lane width, in the display 5A. As illustrated in the figure, solely a part of the line icon 58 may be displayed. However, in a case where the surrounding environment recognition unit 7 recognizes the lane marker 54, movement of the vehicle 2 toward the lane 50C causes an entirety of the line icon 58 to be displayed as appropriate in the display 5A. In other words, allowing the own-vehicle icon 31 to be on the fixed display and allowing the line icons 55 to 58 to be on the movable display make it unnecessary to display all the line icons 55 to 58 in the display 5A. For example, it is possible to display information on three or more lanes in turn, in accordance with the movement of the vehicle 2, in a display space that allows for display of two lanes. This way of display provides the driver with the easily visible display, without reducing in size the display of the own-vehicle icon 31 and the display of the line icons 55 to 58. Hence, it is possible for the driver to easily and intuitively grasp the traveling environment.

It is to be noted that in this implementation, described are cases where the vehicle 2 travels on the road including two lanes on each side, and the road including three lanes on each side. However, this is non-limiting. For example, in a case where the vehicle 2 travels on a road including a single lane on each side, or a road including four or more lanes on each side, allowing the display unit 5 to provide the fixed display of the own-vehicle icon of the vehicle 2 and the movable display of the line icons of the lane markers of the road in the right-left direction makes it possible to produce similar effects.

According to a display device for a vehicle of an implementation of the technology, a surrounding environment recognition unit recognizes surrounding information of an own vehicle. In displaying the surrounding information on a display unit, an own-vehicle icon is on fixed display, while line icons are on movable display in a lateral direction of the display unit. This way of display prevents flickering display of display contents in the display unit, and provides a driver with easily visible display. Hence, it is possible for the driver to easily and intuitively grasp the surrounding information of the own vehicle.

Moreover, according to the display device for the vehicle of the implementation of the technology, the display unit may display not only the line icons of an own-vehicle-traveling lane but also an adjacent-lane line icon, in a case where the surrounding environment recognition unit recognizes not only an own-vehicle-traveling lane but also an adjacent lane. In this way of display, the line icons and the adjacent-lane line icon may be on the movable display on the display unit, in accordance with movement of the own vehicle in a direction of a lane width. Hence, it is possible to provide display of lane lines of three or more lanes in a display area that allows for display of lane lines of two lanes. In other words, it is possible to display information on a plurality of lanes in a narrow display area of the display device, without shrinking the own-vehicle icon and other icons. Hence, it is possible for the driver to easily and intuitively grasp the surrounding information on not only the own-vehicle traveling lane but also the adjacent lane.

Furthermore, according to the display device for the vehicle of the implementation of the technology, the display unit may display the line icons and the adjacent-lane line icon. The line icons and the adjacent-lane line icon may be on the movable display in an opposite direction to a direction in which the own vehicle makes a lane change. In this way of display, the display unit provides the fixed display of the own-vehicle icon. Thus, the display unit provides the display in consistency with a view the driver actually gets. Hence, it is possible for the driver to easily and intuitively grasp the surrounding information of the own vehicle.

In addition, according to the display device for the vehicle of the implementation of the technology, with the surrounding environment recognition unit recognizing a curve forward in the own-vehicle-traveling lane, the line icons and the adjacent-lane line icon may be displayed, with their upper ends being bent. In this way of display, it is possible for the driver to easily and intuitively grasp the information on the traveling lane forward.

Moreover, according to the display device for the vehicle of the implementation of the technology, the line icons and the adjacent-lane line icon may be displayed, with a clearance between the line icons being constant, and with a clearance between one of the line icons and the adjacent-lane line icon sideward of the relevant one of the line icons being constant. In this way of display, it is possible to prevent excessively swinging display of the line icons and the adjacent-lane line icon on the display unit in the lateral direction of the display unit. Hence, it is possible to provide the driver with the easily visible display.

Furthermore, according to the display device for the vehicle of the implementation of the technology, the surrounding environment recognition unit may include a camera, radar, or a communication unit, or any combination thereof. The camera, the radar, and the communication unit may be provided in the own vehicle. With this configuration, it is possible to acquire the surrounding information of the own vehicle by various methods, in accordance with the road surface states, the traveling environment, and other circumstances. Hence, it is possible to allow the display unit to display the own-vehicle icon, the line icons, or the adjacent-lane line icon, or any combination thereof, as appropriate.

In one implementation described above, the vehicle control unit 3, the display unit 5, and the surrounding environment recognition unit 7 illustrated in FIG. 1 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle control unit 3, the display unit 5, and the surrounding environment recognition unit 7. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A display device for a vehicle, the display device comprising:
   one or more sensors configured to detect surrounding environment information of an own vehicle traveling in an own-vehicle traveling lane, the surrounding environment information comprising the own-vehicle traveling lane and an adjacent traveling lane, the own-vehicle traveling lane comprising a first lane marker and a second lane marker, the adjacent traveling lane comprising the second lane marker and a third lane marker;
   a display;
   at least one processor: and
   a machine-readable medium storing instructions, which when executed by the at least one processor, cause the at least one processor to perform operations comprising:
      displaying, on the display, an own-vehicle icon depicting the own vehicle;
      receiving, from the one or more sensors, the surrounding environment information of the own vehicle;
      displaying, on the display, a first line icon, a second line icon, and a third line icon based on the surrounding environment information, wherein the first line icon, the second line icon, and the third line icon respectively depict the first lane marker, the second lane marker, and the third lane marker, the own-vehicle icon is displayed between the first line icon and the second line icon line icon;
      when a lane change of the own vehicle from the own-vehicle traveling lane to the adjacent traveling lane is detected based on the surrounding environment information, shifting a first display position of the first line icon, a second display position of the second line icon, and a third display position of the third line icon in a first direction opposite a second direction in which the own vehicle moved between the own-vehicle traveling lane and the adjacent traveling lane while the own-vehicle icon stays stationary on the display; and
      in response shifting the first display position of the first line icon, the second display position of the second line icon, and the third display position of the third line icon in the first direction, displaying, on the display, the own-vehicle icon between the second line icon and the third line icon.

2. The display device for the vehicle according to claim 1, wherein the first line icon, the second line icon, and the third line icon extend from a lower end of the display to an upper end of the display,
   a first clearance between the first line icon and the second line icon decreases from the lower end of the display to the upper end of the display, and
   a second clearance between the second line icon and the third line icon decreases from the lower end of the display to the upper end of the display.

3. The display device for the vehicle according to claim 2, wherein when a curve is detected ahead of a traveling direction of the own-vehicle traveling lane, upper portions of first line icon, the second line icon, and the third line icon bend in a direction that the detected curve is bent.

4. The display device for the vehicle according to claim 3, wherein
   when a change from a first lane width to a second lane width is detected between the first lane marker and the second line marker of the own-vehicle-traveling lane, the first clearance between the first line icon and the second line icon is maintained on the display regardless of the change from the first lane width to the second lane width is detected, and
   when a change from a third lane width to a fourth lane width is detected between the second line marker and the third line marker of the adjacent traveling lane, the second clearance between the second line icon and the third line icon is maintained on the display regardless of the change from the third lane width to the fourth lane width is detected.

5. The display device for the vehicle according to claim 4, wherein
   the one or more sensors comprise a camera, radar, or a communication unit, or any combination thereof, the camera, the radar, the communication unit being disposed in the own vehicle.

6. The display device for the vehicle according to claim 3, wherein
the one or more sensors comprise a camera, radar, or a communication unit, or any combination thereof, the camera, the radar, the communication unit being disposed in the own vehicle.

7. The display device for the vehicle according to claim 2, wherein
when a change from a first lane width to a second lane width is detected between the first lane marker and the second line marker of the own-vehicle-traveling lane, the first clearance between the first line icon and the second line icon is maintained on the display regardless of the change from the first lane width to the second lane width is detected, and
when a change from a third lane width to a fourth lane width is detected between the second line marker and the third line marker of the adjacent traveling lane, the second clearance between the second line icon and the third line icon is maintained on the display regardless of the change from the third lane width to the fourth lane width is detected.

8. The display device for the vehicle according to claim 7, wherein
the one or more sensors comprise a camera, radar, or a communication unit, or any combination thereof, the camera, the radar, the communication unit being disposed in the own vehicle.

9. The display device for the vehicle according to claim 2, wherein
the one or more sensors comprise a camera, radar, or a communication unit, or any combination thereof, the camera, the radar, the communication unit being disposed in the own vehicle.

10. The display device for the vehicle according to claim 1, wherein when a curve is detected ahead of a traveling direction of the own-vehicle traveling lane, upper portions of first line icon, the second line icon, and the third line icon bend in a direction that the detected curve is bent.

11. The display device for the vehicle according to claim 10, wherein
when a change from a first lane width to a second lane width is detected between the first lane marker and the second line marker of the own-vehicle-traveling lane, a first clearance between the first line icon and the second line icon is maintained on the display regardless of the change from the first lane width to the second lane width is detected, and
when a change from a third lane width to a fourth lane width is detected between the second line marker and the third line marker of the adjacent traveling lane, a second clearance between the second line icon and the third line icon is maintained on the display regardless of the change from the third lane width to the fourth lane width is detected.

12. The display device for the vehicle according to claim 11, wherein
the one or more sensors comprise a camera, radar, or a communication unit, or any combination thereof, the camera, the radar, the communication unit being disposed in the own vehicle.

13. The display device for the vehicle according to claim 10, wherein
the one or more sensors comprise a camera, radar, or a communication unit, or any combination thereof, the camera, the radar, the communication unit being disposed in the own vehicle.

14. The display device for the vehicle according to claim 1, wherein
the one or more sensors comprise a camera, radar, or a communication unit, or any combination thereof, the camera, the radar, the communication unit being disposed in the own vehicle.

15. A display device for a vehicle, the display device comprising:
a detector configured to detect surrounding environment information of an own vehicle traveling in an own-vehicle traveling lane, the surrounding environment information comprising the own-vehicle traveling lane and an adjacent traveling lane, the own-vehicle traveling lane comprising a first lane marker and a second lane marker, the adjacent traveling lane comprising the second lane marker and a third lane marker;
a display; and
circuitry being configured to
display, on the display, an own-vehicle icon depicting the own vehicle, the own-vehicle icon being displayed substantially at a middle point between a first side and a second side of the display area, the first side disposed opposite the second side;
receive, from the one or more sensors, the surrounding environment information of the own vehicle;
display, on the display, a first line icon, a second line icon, and a third line icon based on the surrounding environment information, wherein
the first line icon depicts the first lane marker,
the first line icon is displayed between the own-vehicle icon and the first side of the display,
the second line icon depicts the second lane marker,
the second line icon is displayed between the own-vehicle icon and the second side of the display,
the third line icon depicts the third lane marker,
the third line is displayed between the second line icon and the second side of the display,
when a lane change of the own vehicle from the own-vehicle-traveling lane to the adjacent traveling lane is detected based on the surrounding environment information, shift a display position of the first line icon, a display position of the second line icon, and a display position of the third line icon in a first direction opposite a second direction in which the own vehicle moved between the own-vehicle traveling lane and the adjacent traveling lane while the own-vehicle icon stays stationary on the display so that the second line icon is displayed between the own-vehicle icon and the first side of the display.

* * * * *